United States Patent
Liu et al.

(10) Patent No.: US 12,486,179 B2
(45) Date of Patent: Dec. 2, 2025

(54) CONTROL METHOD FOR DELAYING NANOFILTRATION MEMBRANE ALUMINUM FOULING OF WATER TREATMENT SYSTEM

(71) Applicant: Greentech Environment Co., Ltd., Beijing (CN)

(72) Inventors: Mu Liu, Beijing (CN); Yingqiang Su, Beijing (CN); Zehua Li, Beijing (CN); Mengyuan Duan, Beijing (CN); Kai Sun, Beijing (CN); Xikun Zhu, Beijing (CN); Huiming Han, Beijing (CN); Liyan Zhang, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 19/239,827

(22) Filed: Jun. 16, 2025

(65) Prior Publication Data
US 2025/0320134 A1    Oct. 16, 2025

Related U.S. Application Data

(63) Continuation of application No. PCT/CN2024/079272, filed on Feb. 29, 2024.

(30) Foreign Application Priority Data

Jul. 21, 2023  (CN) .......................... 202310898091.4

(51) Int. Cl.
*C02F 1/00* (2023.01)
*B01D 61/04* (2006.01)
(Continued)

(52) U.S. Cl.
CPC .............. *C02F 1/008* (2013.01); *B01D 61/04* (2013.01); *B01D 61/12* (2013.01); *B01D 61/16* (2013.01);
(Continued)

(58) Field of Classification Search
None
See application file for complete search history.

(56) References Cited

U.S. PATENT DOCUMENTS

| | | | |
|---|---|---|---|
| 2007/0045189 A1* | 3/2007 | Lichtner | B01D 61/58 210/652 |
| 2016/0176739 A1* | 6/2016 | Ukai | C02F 1/42 210/639 |
| 2022/0259086 A1 | 8/2022 | Sauvignet et al. | |

FOREIGN PATENT DOCUMENTS

| | | |
|---|---|---|
| CN | 102432117 A | 5/2012 |
| CN | 104556481 A | 4/2015 |

(Continued)

*Primary Examiner* — Richard C Gurtowski (57) ABSTRACT

A water treatment system for delaying nanofiltration membrane aluminum fouling, including an ultrafiltration system and a nanofiltration system. The ultrafiltration system includes a first water supply sub-system, an ultrafiltration membrane group and a first water production sub-system sequentially in pipeline connection. A first dosing pipeline is provided between the first water supply sub-system and the ultrafiltration membrane group, and has a dosing port for adding a first scale inhibitor. The nanofiltration system includes a second water supply sub-system, a nanofiltration membrane group and a second water production sub-system sequentially in pipeline connection. The second water supply sub-system is communicated with the first water production sub-system. A second dosing pipeline is provided between the second water supply sub-system and the nanofiltration membrane group, and has a dosing port for adding a second scale inhibitor. A control method for delaying nanofiltration membrane aluminum fouling of a water treatment system is also provided.

8 Claims, 3 Drawing Sheets

(51) Int. Cl.
    *B01D 61/12*    (2006.01)
    *B01D 61/16*    (2006.01)
    *B01D 61/22*    (2006.01)
    *B01D 61/58*    (2006.01)
    *B01D 65/02*    (2006.01)
    *C02F 9/00*    (2023.01)
    *B01D 61/02*    (2006.01)
    *B01D 61/14*    (2006.01)
    *C02F 1/44*    (2023.01)
    *C02F 5/08*    (2023.01)

(52) U.S. Cl.
    CPC ............ *B01D 61/22* (2013.01); *B01D 61/58* (2013.01); *B01D 65/02* (2013.01); *C02F 9/00* (2013.01); *B01D 61/027* (2013.01); *B01D 61/145* (2013.01); *B01D 2311/04* (2013.01); *B01D 2321/04* (2013.01); *B01D 2321/162* (2013.01); *C02F 1/442* (2013.01); *C02F 1/444* (2013.01); *C02F 5/08* (2013.01); *C02F 2209/02* (2013.01); *C02F 2209/03* (2013.01); *C02F 2209/05* (2013.01); *C02F 2209/44* (2013.01); *C02F 2303/16* (2013.01)

(56) References Cited

FOREIGN PATENT DOCUMENTS

| CN | 109231546 A | 1/2019 |
|---|---|---|
| CN | 209619041 U | 11/2019 |
| CN | 111646589 A | 9/2020 |
| CN | 116425267 A | 7/2023 |
| CN | 116621396 A | 8/2023 |

\* cited by examiner

CONTROL METHOD FOR DELAYING NANOFILTRATION MEMBRANE ALUMINUM FOULING OF WATER TREATMENT SYSTEM

CROSS-REFERENCE TO RELATED APPLICATIONS

This application is a continuation of International Patent Application No. PCT/CN2024/079272, filed on Feb. 29, 2024, which claims the benefit of priority from Chinese Patent Application No. 202310898091.4, filed on Jul. 21, 2023. The content of the aforementioned application, including any intervening amendments made thereto, is incorporated herein by reference in its entirety.

TECHNICAL FIELD

This application relates to water treatment, and more particularly to a control method for delaying nanofiltration membrane aluminum fouling of a water treatment system.

BACKGROUND

In water treatment processes, especially deep-water treatment, the combination of ultrafiltration and nanofiltration is considered as a common membrane separation system configuration. Ultrafiltration serves as pretreatment for nanofiltration to provide a high-quality influent for nanofiltration. Typically, spiral-wound nanofiltration membranes are employed, with the influent of the membrane system sourced from the effluent of existing water plant systems, which is conventionally treated by coagulation and sedimentation +sand filtration. Spiral-wound nanofiltration requires strict pretreatment, specifically, the silt density index (SDI) of the influent must be less than 5, the influent turbidity must be less than 0.5 nephelometric turbidity unit (NTU), and aluminum content in the influent must be less than 0.05-0.10 ppm. In most cases, the sand filtration effluent has an SDI of not less than 3 and often higher than 5, a turbidity of 0.10-1.00 NTU and an aluminum ion of 0.10-0.19 ppm. Although the ultrafiltration, as a pretreatment for nanofiltration, can stabilize the SDI of the effluent below 5 and the turbidity below 0.10 NTU, it has almost no interception ability for aluminum. As a result, the aluminum ions in the nanofiltration influent exceed the acceptable value of the system, causing aluminum fouling of the nanofiltration membrane. At the same time, the aluminum ions react with the scale inhibitor added during the nanofiltration operation to form colloidal precipitates that adhere to the inlet side of the nanofiltration membrane. On the one hand, the fouling of the nanofiltration membrane is accelerated. On the other hand, due to the reduction in the effective content of the scale inhibitor, the scaling tendency on the concentrate side of the nanofiltration membrane increases, which further aggravates the fouling of the nanofiltration membrane, resulting in frequent shutdowns for maintenance of the nanofiltration membrane group and high water production costs of the system.

SUMMARY

An object of the disclosure is to provide a water treatment system for delaying nanofiltration membrane aluminum fouling and a control method thereof, so as to solve the above technical problems in the prior art.

In order to achieve the above object, the following technical solutions are adopted.

In a first aspect, this application provides a water treatment system for delaying nanofiltration membrane aluminum fouling, comprising:
an ultrafiltration system; and
a nanofiltration system;
wherein the ultrafiltration system comprises a first water supply sub-system, an ultrafiltration membrane group and a first water production sub-system sequentially in pipeline connection; a first dosing pipeline is provided between the first water supply sub-system and the ultrafiltration membrane group, and the first dosing pipeline is provided with a first dosing port for adding a first scale inhibitor and a second dosing port for adding a flocculant; and
the nanofiltration system comprises a second water supply sub-system, a nanofiltration membrane group and a second water production sub-system sequentially in pipeline connection; the second water supply sub-system is communicated with the first water production sub-system; a second dosing pipeline is provided between the second water supply sub-system and the nanofiltration membrane group, and the second dosing pipeline is provided with a third dosing port for adding a second scale inhibitor and a fourth dosing port for adding a reductant.

In some embodiments, the first dosing port and the second dosing port are arranged spaced apart from each other, and the first dosing port is located at an upstream side of the second dosing port.

In some embodiments, the nanofiltration system further comprises a cleaning sub-system; the cleaning sub-system comprises a cleaning pipeline and a wastewater collection unit; a cleaning port is provided at the upstream side of the nanofiltration membrane group; the cleaning pipeline is communicated with the cleaning port; and the wastewater collection unit is communicated with the nanofiltration membrane group.

In some embodiments, the cleaning pipeline is provided with an acid port for adding an acid solution.

In some embodiments, the water treatment system further comprises a program control system; wherein the program control system is configured to collect parameters of the water treatment system, control operation of the ultrafiltration system and the nanofiltration system, and dynamically adjust dosages of the first scale inhibitor, the second scale inhibitor, the flocculant and the acid solution according to the parameters of the water treatment system.

In a second aspect, this application provides a control method for delaying nanofiltration membrane aluminum fouling of a water treatment system, the water treatment system comprising an ultrafiltration system, a nanofiltration system and a program control system; each of the ultrafiltration system and the nanofiltration system having a water filtration function and a self-cleaning function; the program control system being configured to collect parameters of the water treatment system, and control operation of the ultrafiltration system and the nanofiltration system according to collected parameters; and the control method comprising:
detecting and recording the parameters of the water treatment system in real time;
activating the water filtration function of the ultrafiltration system;
activating the water filtration function of the nanofiltration system;

determining whether there is aluminum fouling in the nanofiltration membrane group;

determining a dosage of the first scale inhibitor and a dosage of the second scale inhibitor;

adding the first scale inhibitor to the ultrafiltration system, and adding the second scale inhibitor to the nanofiltration system; and after a filtration period is completed, activating the self-cleaning function of the ultrafiltration system to perform backwashing on the ultrafiltration membrane group, and activating the self-cleaning function of the nanofiltration system to flush the nanofiltration membrane group.

In some embodiments, the control method further comprises:

before the filtration period is completed, collecting the parameters of the water treatment system within a first preset time before an end of the filtration period, determining whether the nanofiltration membrane group requires chemical enhanced backwashing, and determining a dosage of the acid solution required for the chemical enhanced backwashing.

In some embodiments, the chemical enhanced backwashing comprises an acid-involved flushing stage and an acid-free flushing stage;

the acid-involved flushing stage is performed through a step of:

after the cleaning sub-system is started, adding a preset dosage of the acid solution through the acid port; and the acid-free flushing stage is performed through a step of:

after the acid-involved flushing stage is completed, closing the acid port, and performing conventional cleaning.

In some embodiments, the control method further comprises:

during a next filtration period after the current filtration-flushing period is completed, collecting an initial influent pressure of the nanofiltration system after starting the next filtration period; and determining whether the nanofiltration membrane group requires restorative chemical cleaning, if yes, shutting down the nanofiltration system, and performing the restorative chemical cleaning on the nanofiltration membrane group.

In some embodiments, the control method further comprises:

before starting the nanofiltration system, measuring a water level of the first water production sub-system to determine whether the water level of the first water production sub-system reaches a preset height.

Compared to the prior art, the present disclosure has the following beneficial effects.

In the water treatment system of the present disclosure, the first dosing port for adding the first scale inhibitor is arranged on the first dosing pipeline, and is located at the upstream side of the ultrafiltration membrane group, the first scale inhibitor can be added through the first dosing port, and the dosage of the second scale inhibitor added through the third dosing port can be reduced. In this way, a part of the aluminum ions are precipitated in the ultrafiltration system, resulting in a reduced content of aluminum ions in the nanofiltration system, so as to reduce or eliminate the aluminum fouling of the nanofiltration membrane group, extend the service life and operational cycle of the nanofiltration membrane group, reduce the frequency of shutdown maintenance of the nanofiltration system, improve the water treatment efficiency of the water treatment system, and reduce the water production cost of the water treatment system.

In the control method of the present disclosure, various parameters of the water treatment system are collected in real time, and the dosages of the first scale inhibitor and the second scale inhibitor are determined according to the various parameters, so that the dosage of the scale inhibitor is maintained at a relatively low level while maintaining an excellent aluminum removal effect, thereby effectively reducing aluminum fouling of the nanofiltration membrane group, extending the service life and operational cycle of the nanofiltration membrane group, and improving the water treatment efficiency of the water treatment system.

BRIEF DESCRIPTION OF THE DRAWINGS

The accompanying drawings, which are incorporated into and constitute a part of this specification, are intended to illustrate the embodiments of the disclosure, and are used for explaining the principles of the disclosure in conjunction with the specification.

In order to illustrate the technical solutions in the embodiments of the present disclosure or in the prior art more clearly, the drawings needed in the description of embodiments or the prior art will be briefly introduced below. Obviously, for those of ordinary skill in the art, other drawings can be obtained based on these drawings without exerting creative efforts.

DETAILED DESCRIPTION OF EMBODIMENTS

In order to understand the above objects, features and beneficial effects of the present disclosure more clearly, the technical solutions of the present disclosure will be further described below. It should be noted that, as long as there is no contradiction, the embodiments of the present disclosure and the features in the embodiments can be combined with each other.

Many specific details are set forth in the following description to facilitate the understanding of the present disclosure, but the present disclosure can also be implemented in other ways different from those described herein. Obviously, described herein are merely some embodiments of the present disclosure, rather than all embodiments.

Figure 1:
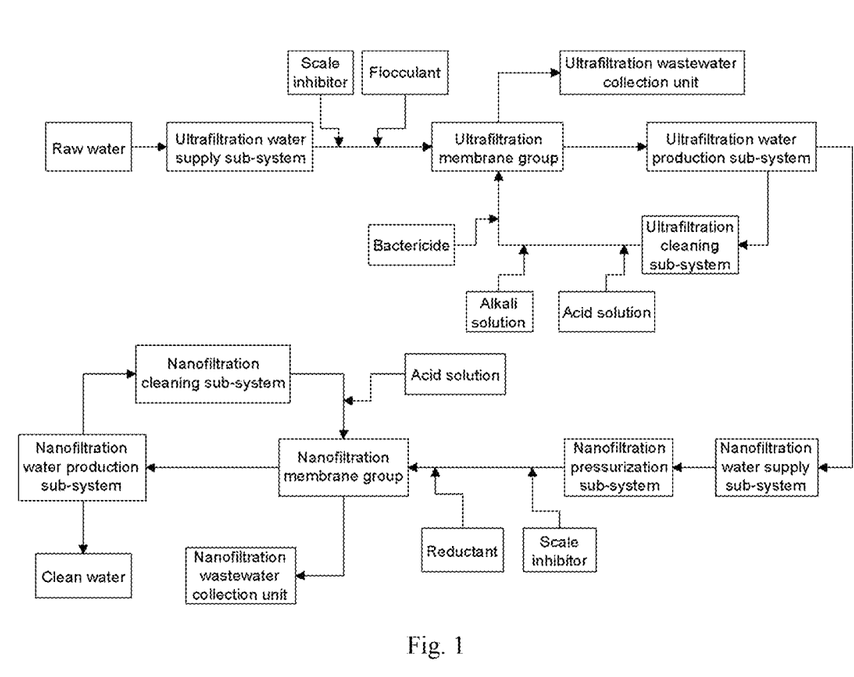
FIG. 1 is a schematic diagram of a water treatment system for delaying aluminum fouling in accordance with an embodiment of the present disclosure.

Referring to FIG. 1, a water treatment system for delaying nanofiltration membrane aluminum fouling is provided, including an ultrafiltration system and a nanofiltration system. The ultrafiltration system includes a first water supply sub-system, an ultrafiltration membrane group and a first water production sub-system sequentially in pipeline connection. A first dosing pipeline is provided between the first water supply sub-system and the ultrafiltration membrane group, and is provided with a first dosing port for adding a first scale inhibitor and a second dosing port for adding a flocculant.

The first water supply sub-system is configured to provide influent pressure for the ultrafiltration system to perform filtration. Specifically, the first water supply sub-system includes a first water supply pump, which is configured to transport raw water to the ultrafiltration membrane group.

The ultrafiltration membrane group is the core of the ultrafiltration system, which is configured to separate the raw water into solid and liquid phases and intercept pollutants to reduce turbidity and produce clear water. The first water production sub-system not only provides a storage pool or water tank and drainage destination for the water produced by the ultrafiltration system, but also provides high-quality influent for the nanofiltration system.

It should be explained that the above raw water refers to water that can withstand the water quality requirements of the ultrafiltration membrane group, such as water after sand filtration treatment.

The nanofiltration system includes a second water supply sub-system, a nanofiltration membrane group and a second water production sub-system connected sequentially in pipeline connection. The second water supply sub-system is communicated with the first water production sub-system. A second dosing pipeline being provided between the second water supply sub-system and the nanofiltration membrane group, and is provided with a third dosing port for adding a second scale inhibitor and a fourth dosing port for adding a reductant.

A pressurization system is provided between the ultrafiltration system and the nanofiltration system. The second water supply sub-system is configured to provide influent flow rate required for the nanofiltration system and starting pressure required for the operation of the pressurization system. Specifically, the second water supply sub-system includes a second water supply pump, which is configured to transport the raw water to the nanofiltration membrane group.

The nanofiltration membrane group is the core of the nanofiltration system, which is configured to separate the raw water into solid and liquid phases, intercept pollutants, reduce organic matter content, and perform desalination and hardness removal to produce clean water. The second water production sub-system provides a storage pool or water tank and a drainage destination for the water produced by the nanofiltration system.

When the water treatment system performs filtration on the raw water, the ultrafiltration influent turbidity of the ultrafiltration system can be detected first, and then a dosage of the flocculant added through the second dosing port can be determined according to the ultrafiltration influent turbidity of the ultrafiltration system. The ultrafiltration system is started, and the calculated dosage of the flocculant is added simultaneously.

In an embodiment, the flocculant is poly aluminum chloride (PAC). Specifically, the ultrafiltration influent turbidity is set as $T_{NU}$, and a dosage of the PAC is $C_1$.

When $T_{NU}$ is lower than 0.3 NTU, $C_1=0.5-2T_{NU}/3$, ranging from 0.3-0.5 ppm.

When $T_{NU}$ is in a range of 0.3-0.5 NTU, $C_1=0.45-0.5T_{NU}$, ranging from 0.2-0.3 ppm.

When $T_{NU}$ is in a range of 0.5-1.0 NTU, $C_1=0.1+0.4T_{NU}$, ranging from 0.3-0.5 ppm.

After the water level in the first water production sub-system reaches a start-up condition of the nanofiltration system, influent quality indexes and operating parameters of the nanofiltration system can be detected first. The influent quality indexes include, but are not limited to, temperature T of an influent of the nanofiltration system, conductivity E of the influent of the nanofiltration system. The operating parameters include, but are not limited to, nanofiltration membrane flux J and nanofiltration recovery rate Y. Then, a total dosage of the first scale inhibitor and the second scale inhibitor is determined according to the influent quality indexes and the operating parameters. Then, the nanofiltration system is started, and the calculated dosage of first and second scale inhibitors and the reductant are added simultaneously.

Specifically, the total dosage of the first scale inhibitor and the second scale inhibitor is set as $C_2$, which is determined by coefficients $a_1$, $a_2$, $b_1$, $b_2$, $c_1$, $c_2$, $d_1$ and $d_2$ related to the temperature T, the conductivity E, the nanofiltration membrane flux J and the nanofiltration recovery rate Y, where $a_1=(35-T)/23$, $b_1=E/200-0.5$, $c_1=0.5J-11$, and $d_1=0.2Y-16$. In a case where the temperature T is greater than or equal to 12° C., $a_2$ is 1, otherwise $a_2$ is 0. In a case where the conductivity E is lower than 300 μs/cm, $b_2$ is 1, otherwise $b_2$ is 0. In a case where the nanofiltration membrane flux J is 20-22 L/(m²·h), $c_2$ is 1, otherwise $c_2$ is 0. In a case where the nanofiltration recovery rate Y is 80%-85%, $d_2$ is 1, otherwise $d_2$ is 0. Accordingly, the total dosage $C_2$ is calculated through the following equation:

$$C_2 = 3.0 + 0.075(a_1a_2 + b_1b_2 + c_1c_2 + d_1d_2) - 0.375(a_2 + b_2 + c_2 + d_2)$$

The total dosage $C_2$ is in a range of 1.5-3.0 ppm.

During the filtration process of the water treatment system, the first scale inhibitor is added through the first dosing port, and the second scale inhibitor is added through the third dosing port, so that the aluminum ions in the treated water can be treated with the scale inhibitor twice. This can effectively reduce the aluminum ion content in the treated water flowing to the nanofiltration membrane group, reduce the aluminum fouling degree of the nanofiltration membrane group, and extend the service life of the nanofiltration membrane group.

Moreover, after reacting with aluminum ions, the first scale inhibitor can react with the flocculant to form a relatively loose colloidal precipitate, and the colloidal precipitate can be intercepted on an upstream side of the ultrafiltration membrane group, resulting in a relatively low aluminum content of the treated water after treatment by the ultrafiltration membrane group. As a result, less precipitate is formed on the upstream side of the nanofiltration membrane group, thereby delaying the blockage caused by aluminum fouling on the nanofiltration membrane group and extending the service life of the nanofiltration membrane group.

At the same time, more precipitate is formed on the upstream side of the ultrafiltration membrane group. Since the ultrafiltration membrane group can be backwashed, the precipitate can be easily removed when the ultrafiltration membrane group is backwashed, so that the ultrafiltration membrane group can maintain an excellent filtering effect after self-cleaning. In addition, less precipitate is formed on the upstream side of the nanofiltration membrane group, which can improve the flushing effect of the nanofiltration membrane group, reduce the frequency of the nanofiltration membrane group being shut down for restorative cleaning, and improve the filtering efficiency of the water treatment system.

According to the water treatment system provided herein, the first dosing port for adding the first scale inhibitor is arranged on the first dosing pipeline, and is located at the upstream side of the ultrafiltration membrane group, the first scale inhibitor can be added through the first dosing port, and the dosage of the second scale inhibitor added through the third dosing port can be reduced. In this way, a part of the aluminum ions are precipitated in the ultrafiltration system, resulting in a reduced content of aluminum ions in the nanofiltration system, so as to reduce or eliminate the aluminum fouling of the nanofiltration membrane group, extend the service life and operational cycle of the nanofiltration membrane group, reduce the frequency of shutdown maintenance of the nanofiltration system, improve the water treatment efficiency of the water treatment system, and reduce the water production cost of the water treatment system.

In some embodiments, the first dosing port and the second dosing port are arranged spaced apart from each other, and the first dosing port is located at an upstream side of the second dosing port. Specifically, a gap between the first dosing port and the second dosing port is not less than 5 m. This can reduce the mutual influence between the scale inhibitor and the flocculant, effectively avoid the poor aluminum ion elimination effect and poor impurity precipitation effect caused by direct reaction between the scale inhibitor and the flocculant. In this way, the scale inhibitor can fully react with the aluminum ions in the ultrafiltration system, and the impurities in the ultrafiltration system can be fully precipitated in the presence of the flocculant, leading to an enhanced aluminum ion elimination effect and water treatment effect of the ultrafiltration system.

Referring to FIG. 1, in some embodiments, the ultrafiltration system further includes a first cleaning sub-system. The first cleaning sub-system comprises a first cleaning pipeline and a first wastewater collection unit. A first cleaning port is provided at the upstream side of the ultrafiltration membrane group. The first cleaning pipeline is communicated with the first cleaning port. The first wastewater collection unit is communicated with the ultrafiltration membrane group.

Specifically, the first cleaning sub-system provides physical and chemical cleaning for the ultrafiltration membrane group to remove contaminants that are clogged and attached to the surface of the membrane elements or the inside of the membrane fibers of the ultrafiltration membrane group, so as to restore the initial filtration performance. The first wastewater collection unit is configured to treat wastewater generated by the first cleaning sub-system, so that the wastewater can be directly discharged, or reduced to neutrality before being discharged in compliance with the standards.

In an embodiment, the first cleaning pipeline can be provided with a first cleaning dosing port, a second cleaning dosing port and a third cleaning dosing port. The first cleaning dosing port is configured to add an acid solution, the second cleaning dosing port is configured to add an alkali solution, and the third cleaning dosing port is configured to add a bactericide. During the cleaning process of the ultrafiltration membrane group, a pH value of the ultrafiltration wastewater can be adjusted by adding the acid solution, the alkali solution or the bactericide for neutralization and elimination of bacteria in the ultrafiltration wastewater to meet the discharge standard and improve the cleaning effect.

After the ultrafiltration membrane group has been running for a certain period of time, a filtration communication valve between the first water supply sub-system and the ultrafiltration membrane group and a filtration communication valve between the first water production sub-system and the ultrafiltration membrane group can be automatically closed, and then a cleaning communication valve between the first cleaning sub-system and the ultrafiltration membrane group and a cleaning communication valve between the first wastewater collection unit and the ultrafiltration membrane group can be opened to perform flushing on the ultrafiltration membrane group to remove the precipitate. Then, the cleaning communication valve can be closed, and the filtration communication valve can be opened again for water treatment.

In this way, the ultrafiltration system has a certain self-cleaning function. When the ultrafiltration membrane group is slightly fouled or slightly clogged, restorative chemical cleaning can be omitted, which effectively improves the cleaning efficiency the water treatment efficiency of the ultrafiltration system, thereby improving the water treatment efficiency of the water treatment system.

Referring to FIG. 1, in some embodiments, the nanofiltration system further includes a second cleaning sub-system. The second cleaning sub-system includes a second cleaning pipeline and a second wastewater collection unit. A second cleaning port is provided at the upstream side of the nanofiltration membrane group. The second cleaning pipeline is communicated with the second cleaning port, and the second wastewater collection unit is communicated with the nanofiltration membrane group.

After the nanofiltration membrane group has been running for a certain period of time, a filtration communication valve between the second water supply sub-system and the nanofiltration membrane group and a filtration communication valve between the second water production sub-system and the nanofiltration membrane group can be automatically closed, and then a cleaning communication valve between the second cleaning sub-system and the nanofiltration membrane group and a cleaning communication valve between the second wastewater collection unit and the nanofiltration membrane group can be opened to perform flushing on the nanofiltration membrane group to remove the precipitate. Then, the cleaning communication valve is closed, and the filtration communication valve is opened again for water treatment.

In this way, the nanofiltration system has a certain self-cleaning function. When the nanofiltration membrane group is slightly fouled or slightly clogged, restorative chemical cleaning can be omitted, which effectively improves the cleaning efficiency and the water treatment efficiency of the nanofiltration system, thereby improving the water treatment efficiency of the water treatment system.

In some embodiments, the second cleaning pipeline is provided with an acid port for adding an acid solution. Specifically, the acid solution can be a hydrochloric acid solution or a citric acid solution. When the acid solution is added through the acid port, cleaning water for cleaning the nanofiltration membrane group is acidic, so that the precipitate attached to the membrane elements of the nanofiltration membrane group can be more easily removed, the aluminum fouling degree of the membrane elements can be effectively reduced, resulting in an enhanced self-cleaning effect of the nanofiltration system.

In some embodiments, the water treatment system further includes a program control system. The program control system is configured to detect the parameters of the water treatment system, control the operation of the ultrafiltration system and the nanofiltration system, and dynamically adjust the dosages of the first scale inhibitor, the second scale inhibitor, the flocculant and the acid solution according to the parameters of the water treatment system. This facilitates the automatic control of the water treatment system, and leads to an enhanced intelligence level and an improved filtration efficiency of the water treatment system.

Figure 2:
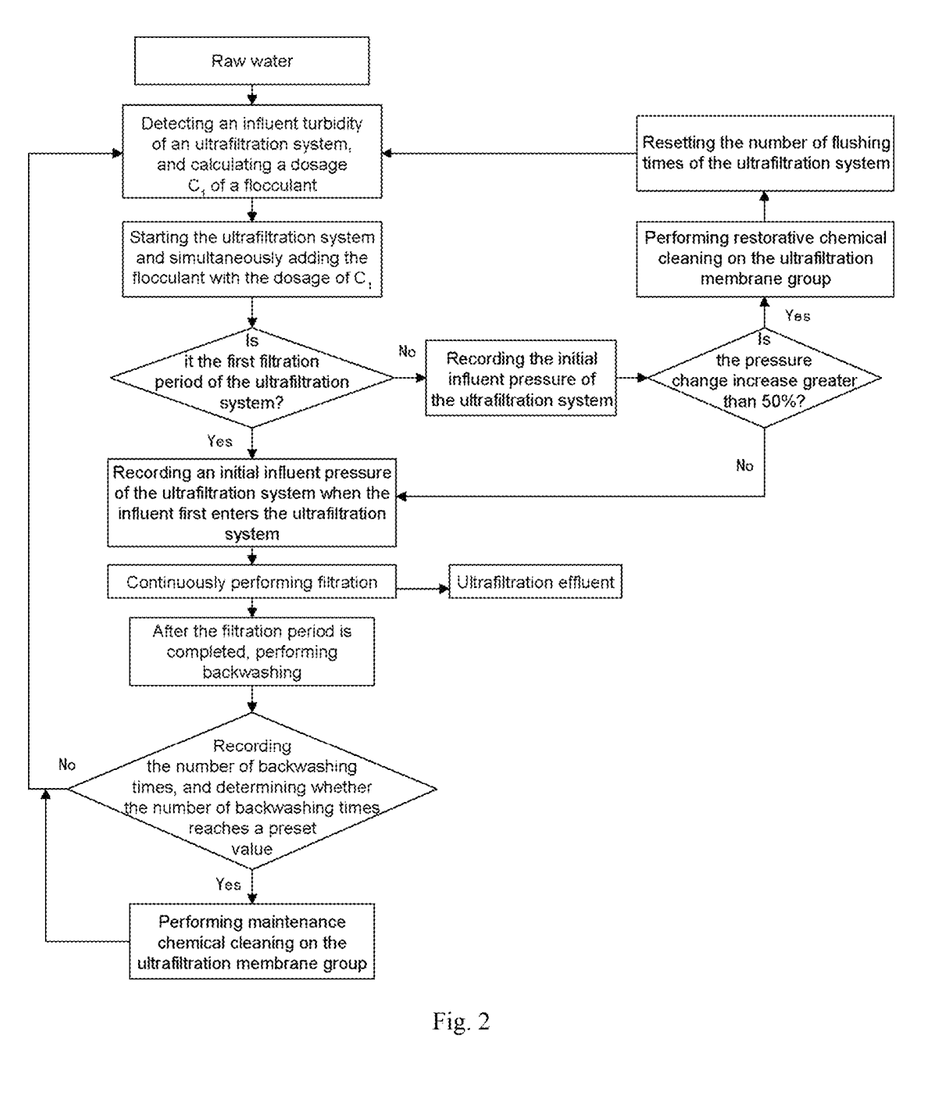
FIG. 2 is a flow chart of a control method of an ultrafiltration system in accordance with an embodiment of the present disclosure.
Figure 3:
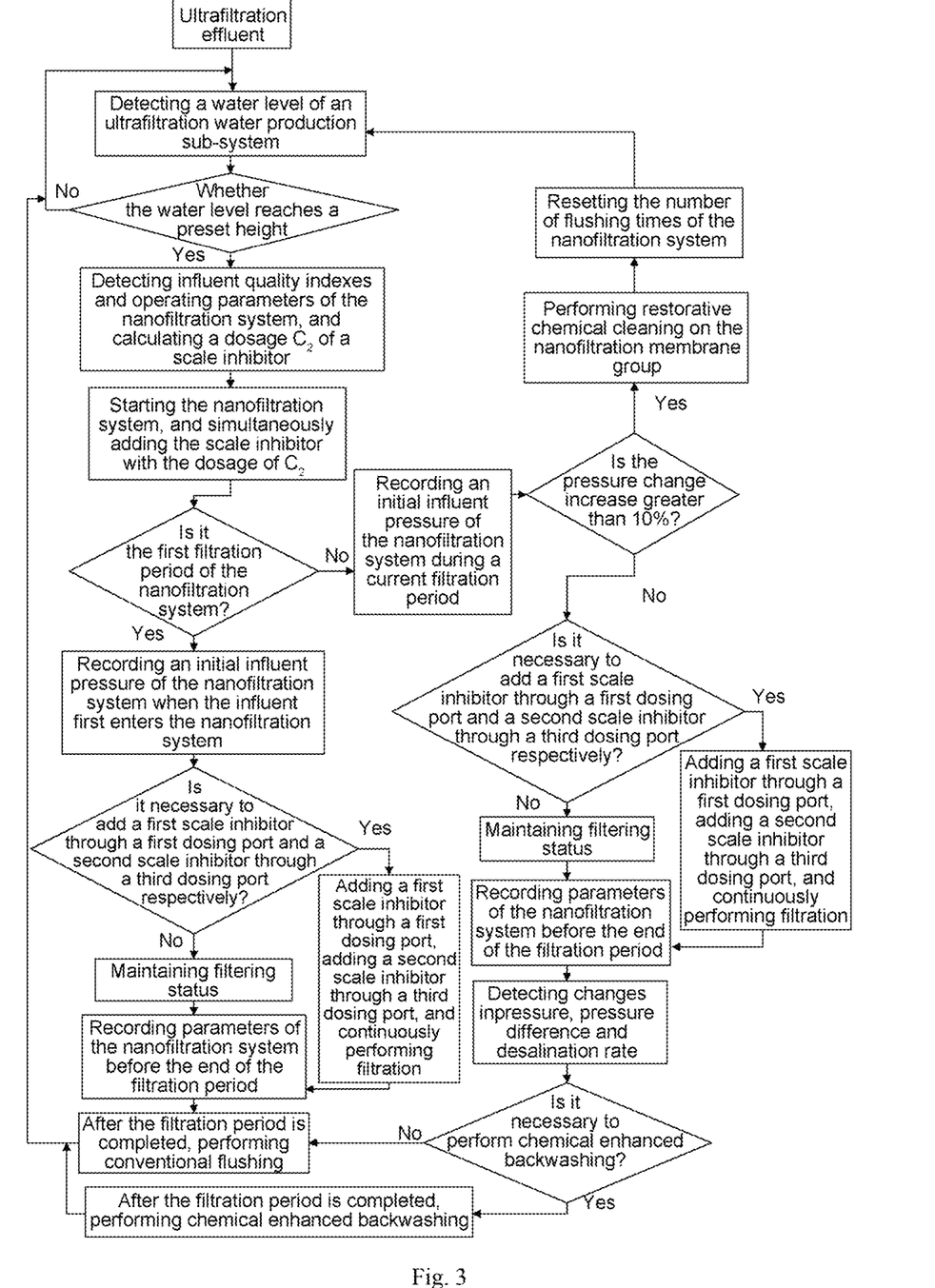
FIG. 3 is a flow chart of a control method of a nanofiltration system in accordance with an embodiment of the present disclosure.

Referring to FIGS. 1-3, a control method for delaying nanofiltration membrane aluminum fouling of a water treatment system is provided. The water treatment system includes an ultrafiltration system, a nanofiltration system and a program control system. Each of the ultrafiltration system and the nanofiltration system has a water filtration function and a self-cleaning function. The program control system is configured to collect the parameters of the water treatment system, and control operation of the ultrafiltration system and the nanofiltration system according to collected data. The control method includes the following steps.

(S1) The parameters of the water treatment system are detected and record in real time. The parameters of the water treatment system include ultrafiltration influent turbidity, nanofiltration influent quality indexes and operating parameters. The nanofiltration influent quality indexes include, but are not limited to, pressure, pressure difference, desalination rate, nanofiltration membrane flux and nanofiltration recovery rate.

(S2) The water filtration function of the ultrafiltration system is activated.

(S3) The water filtration function of the nanofiltration system is activated.

(S4) Whether there is aluminum fouling in the nanofiltration membrane group is determined.

(S5) A dosage of the first scale inhibitor and a dosage of the second scale inhibitor are determined.

(S6) The first scale inhibitor is added to the ultrafiltration system. The second scale inhibitor is added to the nanofiltration system.

(S7) After a filtration period is completed, the self-cleaning function of the ultrafiltration system is activated to perform backwashing on the ultrafiltration membrane group, and the self-cleaning function of the nanofiltration system is activated to flush the nanofiltration membrane group.

Before the water treatment system is started, the ultrafiltration influent turbidity of the ultrafiltration system is detected, and the dosage of the flocculant is calculated. The influent quality indexes and the operating parameters of the nanofiltration system are detected, and the total dosage of the first scale inhibitor and the second scale inhibitor is calculated.

When the water treatment system is started for the first time, the water filtration function of the ultrafiltration system can be activated first, and the calculated dosage of the flocculant can be added simultaneously. When the water level in the first water production sub-system reaches a preset value for starting the nanofiltration system, the water filtration function of the nanofiltration system can be activated, and the calculated dosage of the scale inhibitor is added simultaneously. Operating pressure, pressure difference and desalination rate change amplitude of the nanofiltration system are recorded at the same time. Specifically, the operating pressure, pressure difference and desalination rate within initial 5 min after the water filtration function of the nanofiltration system is started are recorded, and the operating pressure, pressure difference and desalination rate within 3 min before the water filtration function of the nanofiltration system is about to be terminated are recorded.

After a first filtration period is completed, the self-cleaning function of the ultrafiltration system is activated to perform backwashing on the ultrafiltration membrane group, and the self-cleaning function of the nanofiltration system is activated to perform conventional cleaning on the nanofiltration membrane group, that is, the nanofiltration membrane group is flushed with the clean water obtained by nanofiltration treatment.

Before starting a second filtration period of the nanofiltration system, the influent quality indexes and operating parameters of the nanofiltration system are detected, and the total dosage $C_2$ of the first scale inhibitor and the second scale inhibitor can be calculated accordingly. Then, the water filtration function of the nanofiltration system is activated, and the calculated dosages of the scale inhibitor and the reductant are added simultaneously. The operating pressure, pressure difference and desalination rate change amplitude of the nanofiltration system are recorded at the same time. The operating pressure, pressure difference and desalination rate within a preset time interval of the current filtration period are compared with those within the same preset time interval of a previous filtration period to determine whether it is necessary to add the first scale inhibitor through the first dosing port. If no, the second scale inhibitor with the dosage of $C_2$ is added through the third dosing port. If yes, the dosage $C_3$ of the first scale inhibitor is calculated, and the first scale inhibitor with the dosage of $C_3$ is added through the first dosing port.

Specifically, determination of whether it is necessary to add the first scale inhibitor through the first dosing port and calculation of the dosage $C_3$ of the first scale inhibitor are performed through the following steps.

Pressure, pressure difference and desalination rate of the nanofiltration system at a certain moment within initial 5 min of a current filtration-flushing period are respectively set as $P_{1,1}$, $P_{2,1}$ and $\eta_{1,1}$. Pressure, pressure difference and desalination rate of the nanofiltration system at a corresponding moment within initial 5 min of a previous filtration-flushing period are respectively set as $P_{1,0}$, $P_{2,0}$ and $\eta_{1,0}$.

A pressure change amplitude is expressed as $\Delta P_1 = P_{1,1} - P_{1,0}$, a pressure change rate is expressed as $\Delta_1 = \Delta P_1 / P_{1,0}$, a pressure difference change amplitude is expressed as $\Delta P_2 = P_{2,1} - P_{2,0}$, a pressure difference change rate is expressed as $\Delta_2 = \Delta P_{2,1} / P_{2,0}$, and a desalination rate change amplitude is expressed as $\Delta \eta_1 = \eta_{1,1} - \eta_{1,0}$. The dosage of the first scale inhibitor added through the first dosing port is $C_3$.

Whether there is aluminum fouling in the nanofiltration membrane group is determined. When a condition where $\Delta_1 > 0$, $\Delta_2 > 0$ and $\Delta \eta_1 > 0$ all occur lasts for 1 min, the nanofiltration membrane group is determined to suffer from aluminum fouling. In this case, the first scale inhibitor needs to be added through the first dosing port. The dosage $C_3$ of the first scale inhibitor is calculated as $C_3 = 0.3 + 15 \Delta \eta_1$, and is set to not exceed 0.5 ppm. Correspondingly, the actual dosage $C_4$ of the second scale inhibitor added through the third dosing port is calculated as $C_4 = C_2 - C_3$. Otherwise, it is determined that the membrane elements of the nanofiltration membrane group does not suffer from aluminum fouling, and only the second scale inhibitor with a dosage of $C_2$ is added through the third dosing port.

After the water filtration function of the nanofiltration system is finished, the self-cleaning function of the nanofiltration system is activated, and the above steps are repeated in the subsequent filtration-flushing period of the water treatment system.

In the control method of the present disclosure, the various parameters of the water treatment system are collected in real time, and the dosages of the first scale inhibitor and the second scale inhibitor are determined according to the various parameters, so that the dosage of the scale inhibitor is maintained at a relatively low level while maintaining an excellent aluminum removal effect, thereby effectively reducing aluminum fouling of the nanofiltration membrane group, extending the service life and operational cycle of the nanofiltration membrane group, and improving the water treatment efficiency of the water treatment system.

Referring to FIGS. 1-3, in some embodiments, before the filtration period is completed, the control method further includes the following steps.

The parameters of the water treatment system within a first preset time before an end of the filtration period are collected. Whether the nanofiltration membrane group requires chemical enhanced backwashing is determined, and a dosage of the acid solution required for the chemical enhanced backwashing is determined.

When the water treatment system is started for the first time, the water filtration function of the ultrafiltration system can be activated first, and the calculated dosage of the flocculant can be added simultaneously. When the water level in the first water production sub-system reaches a preset value for starting the nanofiltration system, the water filtration function of the nanofiltration system can be activated, and the calculated dosage of the scale inhibitor is added simultaneously. At the same time, the operating pressure, pressure difference and desalination rate change amplitude of the nanofiltration system within a first preset time are recorded. Specifically, the operating pressure, pressure difference and desalination rate within 3 min before the water filtration function of the nanofiltration system is about to be terminated are recorded.

After the first filtration period of the water filtration function of the ultrafiltration system is completed, the self-cleaning function of the ultrafiltration system is activated to perform backwashing on the ultrafiltration membrane group. The self-cleaning function of the nanofiltration system is activated to perform conventional cleaning on the nanofiltration membrane group, that is, the nanofiltration membrane group is flushed with the clean water obtained by nanofiltration treatment.

Then, the water filtration function of the nanofiltration system is activated to start the second filtration period of the nanofiltration system, and the operating pressure, pressure difference and desalination rate change amplitude of the nanofiltration system within the first preset time are recorded.

The operating pressure, pressure difference and desalination rate within a preset time interval of the second filtration period are compared with those within the same preset time interval of a previous filtration period to determine whether the nanofiltration membrane group requires chemical enhanced backwashing. If yes, the dosage of the acid solution required to be added to the cleaning sub-system is calculated. Otherwise, conventional cleaning is performed.

Specifically, determination of whether the nanofiltration membrane group requires the chemical enhanced backwashing and calculation of the dosage of the acid solution are performed through the following steps.

Pressure, pressure difference and desalination rate of the nanofiltration system at a certain moment within 3 min before the end of the current filtration-flushing period are respectively set as $P_{3,1}$, $P_{4,1}$ and $\eta_{2,1}$. Pressure, pressure difference and desalination rate of the nanofiltration system at a corresponding moment within 3 min before the end of a previous filtration-flushing period are respectively set as $P_{3,0}$, $P_{4,0}$ and $\eta_{2,0}$.

A pressure change amplitude is expressed as $\Delta P_3 = P_{3,1} - P_{3,0}$, a pressure change rate is expressed as $\Delta_3 = \Delta P_3/P_{3,0}$, a pressure difference change amplitude is expressed as $\Delta P_4 = P_{4,1} - P_{4,0}$, a pressure difference change rate is expressed as $\Delta_4 = \Delta P_4/P_{4,0}$, and a desalination rate change amplitude is expressed as $\Delta\eta_2 = \eta_{2,1} - \eta_{2,0}$. The dosage of the acid solution added through the acid port is $C_5$.

Whether there is intensified aluminum fouling in the nanofiltration membrane group is determined. When a condition where $\Delta_3 > 3\%$, $\Delta_4 > 5\%$ and $\Delta\eta_2 > 2\%$ all occur lasts for 1 min, the nanofiltration membrane group is determined to suffer from intensified aluminum fouling. In this case, the nanofiltration membrane group requires the chemical enhanced backwashing. When the self-cleaning function of the nanofiltration system is activated, the acid solution is added for chemical enhanced backwashing. The dosage $C_5$ of the acid solution is calculated as $C_5 = 200 + 200 \times (\Delta\eta_2 - 2\%)/3\%$, and is set to not exceed 400 ppm (that is, in a range of 200-400 ppm), and the pH value of the solution for the chemical enhanced backwashing should be 2.0-5.0. Otherwise, it is determined that the aluminum fouling of the membrane elements of the nanofiltration membrane group has not intensified, and conventional cleaning is performed on the nanofiltration membrane group.

According to the various parameters of the water treatment system, the flushing type of the nanofiltration membrane group can be determined. The appropriate flushing type can be selected intelligently and accurately, resulting in a reduction in the dosage of the acid solution, an extension of the restorative chemical cleaning cycle of the nanofiltration membrane group, a reduction in the frequency of restorative chemical cleaning of the nanofiltration membrane group, an improvement in the filtration efficiency of the water treatment system, and a reduction in the operating cost of the water treatment system.

Referring to FIGS. 1-3, in some embodiments, the chemical enhanced backwashing includes an acid-involved flushing stage and an acid-free flushing stage. The acid-involved flushing stage is performed through the following step. After the cleaning sub-system is started, adding a preset dosage of the acid solution through the acid port. The acid-free flushing stage is performed through the following step. After the acid-involved flushing stage is completed, the acid port is closed, and conventional cleaning is performed. Specifically, the acid-involved flushing stage and the acid-free flushing stage each occupy half of the cleaning period of the nanofiltration system.

The acid solution is added for flushing first, so that the precipitate on the membrane elements of the nanofiltration membrane group can be effectively removed, and the filtration holes of the membrane elements of the nanofiltration membrane group can be cleared. In this way, the nanofiltration membrane group can be restored to an excellent filtering effect. After the acid-involved flushing stage is completed, the acid-free flushing stage is performed, which can effectively remove the acid solution remaining on the membrane elements of the nanofiltration membrane group during the acid-involved flushing stage to effectively reduce the influence of the residual acid solution on the filtering performance of the nanofiltration membrane group. This allows the nanofiltration membrane group to maintain an excellent filtering performance after the chemical enhanced backwashing.

Referring to FIGS. 1 and 3, in some embodiments, the control method further includes the following steps.

During a next filtration period after the current filtration-flushing period is completed, an initial influent pressure of the nanofiltration system after starting the next filtration period is collected.

Whether the nanofiltration membrane group requires restorative chemical cleaning is determined, if yes, the nanofiltration system is shut down, and the restorative chemical cleaning is performed on the nanofiltration membrane group.

When the filtration function of the nanofiltration system is activated for the second time or thereafter, the initial influent pressure of the nanofiltration system at the beginning of the filtration period is recorded and compared with the initial influent pressure of the nanofiltration system when the filtration function of the nanofiltration system is activated for the first time to determine whether the nanofiltration membrane group requires restorative chemical cleaning. If the initial influent pressure during the current filtration period is not greater than the initial influent pressure during the first filtration period, or the initial influent pressure during the current filtration period is greater than the initial influent pressure during the first filtration period and the pressure change increase is not greater than 10%, it is determined that the self-cleaning function of the nanofiltration system has an excellent flushing effect, the nanofiltration membrane group has been restored to the preset filtration performance, and the filtration function can be continuously performed.

If the initial influent pressure during the current filtration period is greater than the initial influent pressure during the first filtration period and the pressure change increase is greater than 10%, it means that the self-cleaning function of the nanofiltration system in the previous flushing period leads to a poor flushing effect, and it is determined that the self-cleaning function of the nanofiltration system cannot restore the nanofiltration membrane group to the preset filtration performance. In this case, the nanofiltration membrane group is determined to require the restorative chemical cleaning. Then, the nanofiltration system is shut down, and the restorative chemical cleaning is performed on the nanofiltration membrane group.

After the restorative chemical cleaning is completed, the filtration is continuously performed, and the number of the filtration-flushing periods of the nanofiltration system is reset. The initial influent pressure of the nanofiltration system at the beginning of the first filtration period after the restorative chemical cleaning is recorded, which is marked as the initial influent pressure during the first filtration period.

The initial influent pressure of each filtration period is compared with the first filtration period, so as to more accurately determine whether the nanofiltration membrane group has been restored to the preset filtration performance. In a case where the nanofiltration membrane group fails to recover to the preset filtration performance, the nanofiltration system is shut down in time, and the restorative chemical cleaning is performed on the nanofiltration membrane group, which can effectively ensure the filtering performance of the nanofiltration system, so that the water treated by the nanofiltration system meets the preset requirements and ensures the reliability of the nanofiltration system.

Referring to FIGS. 1 and 2, in some embodiments, when the backwashing times of the ultrafiltration membrane group reaches a preset value, the control method further includes the following steps. Maintenance chemical cleaning is performed on the ultrafiltration membrane group, that is, when the first cleaning sub-system is turned on, the acid solution, the alkali solution and the bactericide are added in a certain order to restore the filtration performance of the ultrafiltration membrane group, thereby improving the reliability of the ultrafiltration membrane group, and extending the service life of the ultrafiltration membrane group.

Referring to FIGS. 1 and 2, in some embodiments, the control method further includes the following steps.

During a next filtration period after the maintenance chemical cleaning of the ultrafiltration system is completed, an initial influent pressure of the ultrafiltration system after the filtration period is started is collected.

Whether the ultrafiltration membrane group requires restorative chemical cleaning is determined, if yes, the ultrafiltration system is shut down, and the restorative chemical cleaning is performed on the ultrafiltration membrane group.

After the maintenance chemical cleaning of the ultrafiltration system is completed, the filtration function is activated. At the beginning of the filtration period, the initial influent pressure of the ultrafiltration system is recorded and compared with the initial influent pressure when the filtration function of the ultrafiltration system is activated for the first time to determine whether the ultrafiltration membrane group requires restorative chemical cleaning. If the initial influent pressure during the current filtration period is not greater than the initial influent pressure during the first filtration period, or the initial influent pressure during the current filtration period is greater than the initial influent pressure during the first filtration period and the pressure change increase is not greater than 50%, it is determined that the self-cleaning function of the ultrafiltration system has an excellent flushing effect, the ultrafiltration membrane group has been restored to the preset filtration performance, and the filtration function can be continuously performed.

If the initial influent pressure during the current filtration period is greater than the initial influent pressure during the first filtration period and the pressure change increase is greater than 50%, it means that the self-cleaning function of the ultrafiltration system in the previous flushing period leads to a poor flushing effect, and it is determined that the self-cleaning function of the ultrafiltration system cannot restore the nanofiltration membrane group to the preset filtration performance. In this case, the ultrafiltration membrane group is determined to require the restorative chemical cleaning. Then, the ultrafiltration system is shut down, and the restorative chemical cleaning is performed on the ultrafiltration membrane group.

After the restorative chemical cleaning is completed, the filtration is continuously performed, and the number of the filtration-flushing periods of the ultrafiltration system is reset. The initial influent pressure of the ultrafiltration system at the beginning of the first filtration period after the restorative chemical cleaning is recorded, which is marked as the initial influent pressure during the first filtration period.

The initial influent pressure of each filtration period is compared with the first filtration period, so as to more accurately determine whether the nanofiltration membrane group has been restored to the preset filtration performance. In a case where the ultrafiltration membrane group fails to recover to the preset filtration performance, the ultrafiltration system is shut down in time, and the restorative chemical cleaning is performed on the ultrafiltration membrane group, which can effectively ensure the filtering performance of the ultrafiltration system, so that the water treated by the ultrafiltration system meets the preset requirements and ensures the reliability of the ultrafiltration system.

Referring to FIGS. 1 and 3, the control method further includes the following steps.

Before starting the nanofiltration system, a water level of the first water production sub-system is measured to determine whether the water level of the first water production sub-system reaches a preset height.

When performing backwashing, maintenance chemical cleaning or restorative chemical cleaning, the nanofiltration system can be prevented from idling, thereby effectively reducing the water production cost of the water treatment system and improving the overall performance of the water treatment system.

Application Example

The present disclosure will be described below in conjunction with specific application examples.

At a certain project site, an influent of the water treatment system is sand-filtered effluent from a water supply plant with surface water as the water source. The sand-filtered effluent has a turbidity of 0.35-0.45 NTU, a temperature of 13-16° C. and a conductivity of 330-425 μs/cm. A nanofiltration membrane flux is set to 24 L/(m²·h), and a nanofiltration recovery rate is set to 85%.

At the beginning of the operation of the water treatment system and during the filtration process, according to the preset conditions, the influent turbidity of the ultrafiltration system is 0.35-0.45 NTU, so the dosage of PAC in the influent of the ultrafiltration system is 0.225-0.275 ppm. Influent quality indexes and operating parameters of the nanofiltration system meet the following conditions: the temperature of the influent of the nanofiltration system is greater than or equal to 12° C., the nanofiltration recovery rate is 80%-85%, and the concentration of the scale inhibitor in the influent of the nanofiltration system is 2.39-2.40 ppm.

At this time, pressure, pressure difference and desalination rate of the nanofiltration system at a certain moment within initial 5 min of a first filtration-flushing period are respectively 0.410-0.412 MPa, 0.361-0.365 bar and 84.9-85.2%. Pressure, pressure difference and desalination rate of the nanofiltration system at a certain moment within 3 min before an end of the first filtration-flushing period are respectively 0.413-0.416 MPa, 0.364-0.370 bar and 84.8-85.3%. During initial 5 min of a second filtration-flushing period, the pressure is 0.411-0.413 MPa, the pressure difference was 0.362-0.365 bar, and the desalination rate was 85.0-85.2%. $\Delta_1>0$, $\Delta_2>0$ and $\Delta\eta_1>0$ all occur but do not last for 1 min, which does not meet the degree of mild aluminum fouling of the nanofiltration membrane group. Only the second scale inhibitor is added through the third dosing port of the nanofiltration system without adding the first scale inhibitor through the first dosing port. Pressure, pressure difference and desalination rate of the nanofiltration system at a certain moment within 3 min before an end of the second filtration-flushing period are respectively 0.414-0.417 MPa, 0.364-0.369 bar and 85.0-85.4%. $\Delta_3>3\%$, $\Delta_4>5\%$ and $\Delta\eta_2>2\%$ all do not occur, which does not meet the degree of intensified aluminum fouling of the membrane elements of the nanofiltration membrane group. In this case, the current flushing is maintained as a conventional flushing, and no chemical enhanced backwashing is performed. Then, the system continues to operate.

When the nanofiltration system is operated until the sixth filtration-flushing period on the sixth day, a condition where $\Delta_1>0$, $\Delta_2>0$ and $\Delta\eta_1>0$ all occur lasts for 1 min, which satisfies the degree of mild aluminum fouling of the nanofiltration membrane group. The first scale inhibitor and the second scale inhibitor are respectively added through the first dosing port and the third dosing port, where $\Delta\eta_1$ is 0.24-0.36%, and the dosage of the first scale inhibitor is 0.336-0.354 ppm. When the nanofiltration system is operated until the seventh filtration-flushing period on the seventh day, $\Delta_1>0$, $\Delta_2>0$ and $\Delta\eta_1>0$ all occur but are not maintained for 1 min, there is no need to add the first scale inhibitor through the first dosing port. The system continued to operate thereafter.

When the nanofiltration system is operated until the 10th filtration-flushing period on the 10th day, the condition where $\Delta_3>3\%$, $\Delta_4>5\%$ and $\Delta\eta_2>2\%$ all occur lasts for 1 min, which satisfies the degree of intensified aluminum fouling of the membrane elements of the nanofiltration membrane group. In this case, the current flushing is the chemical enhanced backwashing, $\Delta\eta_2$ is 2.3%-3.9%, and the dosage of the acid solution is 220-260 ppm. A maximum value of 260 ppm is selected, so that the corresponding pH value of the solution for the chemical enhanced backwashing is 3.8. When entering the 11th filtration period on the 11th day, since the chemical enhanced backwashing of the 10th filtration-flushing period exhibits an excellent effect, $\Delta_1>0$, $\Delta_2>0$ and $\Delta\eta_1>0$ all occur but are not maintained for 1 min, and $\Delta_3>3\%$, $\Delta_4>5\%$ and $\Delta\eta_2>2\%$ all do not occur. The system continued to operate thereafter.

Then, from the 12th to the 62nd day, i.e., the 12th to the 62nd filtration-flushing period, a total of 20 filtration-flushing periods requires addition of the first scale inhibitor through the first dosing port, and 13 chemical enhanced backwashing times are performed. During the above operation period, compared with the first filtration-flushing period, the change increase of the initial operating pressure of the nanofiltration system after flushing is no more than 10%, the pressure difference increase after ultrafiltration chemical enhanced backwashing (CEB) is less than 50%, and the nanofiltration flushing and ultrafiltration CEB show excellent effects.

On the 63rd day of operation of the nanofiltration system, the initial operating pressure is 0.453-0.459 MPa. Compared with the first filtration-flushing period, the pressure change increase is greater than 10%. At this time, the flushing exhibits a poor flushing effect, and the nanofiltration system is shut down for CIP operation. After the CIP is completed, the system pressure is restored to about 0.41 MPa. The current CIP operation period of the nanofiltration system is 63 days. During the same period, two times of CIP are performed on the conventionally operated nanofiltration system (i.e., only the second scale inhibitor is added through the third dosing port), with intervals of 23 days and 25 days respectively. It can be seen that the control method of the present disclosure can effectively delay and eliminate aluminum fouling, extend the CIP frequency of the nanofiltration system, resulting in improved production efficiency.

It should be noted that in this application, relational terms such as "first" and "second" are only used to distinguish one entity or operation from another entity or operation, and do not necessarily require or imply any actual relationship or order between these entities or operations. Furthermore, terms "comprise", "include", or any other variations thereof are intended to cover a non-exclusive inclusion such that a process, method, article, or apparatus includes not only those mentioned elements but also other elements not expressly listed, or elements that are inherent to such process, method, article, or apparatus. Without further limitation, an element defined by the statement "comprises a . . . " does not exclude the presence of additional identical elements in a process, method, article, or apparatus that includes the mentioned element.

The above embodiments are merely illustrative to enable those skilled in the art to understand or implement the present disclosure, and thus should not be regarded as limitation to the present disclosure. It should be understood that various modifications, variations and replacements made without departing from the spirit or scope of the disclosure shall fall within the scope of the present disclosure defined by the appended claims.

What is claimed is:

1. A control method for delaying nanofiltration membrane aluminum fouling of a water treatment system, the water treatment system comprising an ultrafiltration system, a nanofiltration system and a program control system; the ultrafiltration system comprising a first water supply sub-system, an ultrafiltration membrane group and a first water production sub-system sequentially in pipeline connection; a first dosing pipeline being provided between the first water supply sub-system and the ultrafiltration membrane group, and the first dosing pipeline being provided with a first dosing port for adding a first scale inhibitor and a second dosing port for adding a flocculant;

the nanofiltration system comprising a second water supply sub-system, a nanofiltration membrane group and a second water production sub-system sequentially in pipeline connection; the second water supply sub-system being communicated with the first water production sub-system; a second dosing pipeline being provided between the second water supply sub-system and the nanofiltration membrane group, and the second dosing pipeline being provided with a third dosing port for adding a second scale inhibitor and a fourth dosing port for adding a reductant;

each of the ultrafiltration system and the nanofiltration system having a water filtration function and a self-cleaning function; the program control system being configured to collect parameters of the water treatment system, and control operation of the ultrafiltration system and the nanofiltration system according to collected parameters; and the control method comprising:
(1) detecting and recording the parameters of the water treatment system in real time;
  wherein the parameters of the water treatment system comprises temperature T of an influent of the nanofiltration system, conductivity E of the influent of the nanofiltration system, nanofiltration membrane flux J, nanofiltration recovery rate Y, pressure $P_{1,1}$, pressure difference $P_{2,1}$ and desalination rate $\eta_{1,1}$ of the nanofiltration system at a certain moment within initial 5 min of a current filtration-flushing period, pressure $P_{1,0}$, pressure difference $P_{2,0}$ and desalination rate $\eta_{1,0}$ of the nanofiltration system at a corresponding moment within initial 5 min of a previous filtration-flushing period, wherein a pressure change amplitude is expressed as $\Delta P_1 = P_{1,1} - P_{1,0}$, a pressure change rate is expressed as $\Delta_1 = \Delta P_1/P_{1,0}$, a pressure difference change amplitude is expressed as $\Delta P_2 = P_{2,1} - P_{2,0}$, a pressure difference change rate is expressed as $\Delta P_2 = \Delta P_2/P_{2,0}$, and a desalination rate change amplitude is expressed as $\Delta \eta_1 = \eta_{1,1} - \eta_{1,0}$;
(2) determining a total dosage $C_2$ of the first scale inhibitor and the second scale inhibitor according to influent quality indexes and operating parameters of the nanofiltration system;
  wherein the influent quality indexes comprise the temperature T and the conductivity E, and the operating parameters comprise the nanofiltration membrane flux J and the nanofiltration recovery rate Y; and the total dosage $C_2$ is calculated through the following equation:

$$C_2 = 3.0 + 0.075(a_1 a_2 + b_1 b_2 + c_1 c_2 + d_1 d_2) - 0.375(a_2 + b_2 + c_2 + d_2),$$

wherein the total dosage $C_2$ is in a range of 1.5-3.0 ppm, $a_1 = (35-T)/23$, $b_1 = E/200 - 0.5$, $c_1 = 0.5J - 11$, and $d_1 = 0.2Y - 16$; in a case where the temperature T is greater than or equal to 12° C., $a_2$ is 1, otherwise $a_2$ is 0; in a case where the conductivity E is lower than 300 μs/cm, $b_2$ is 1, otherwise $b_2$ is 0; in a case where the nanofiltration membrane flux J is 20-22 L/(m²·h), $c_2$ is 1, otherwise $c_2$ is 0; and in a case where the nanofiltration recovery rate Y is 80%-85%, $d_2$ is 1, otherwise $d_2$ is 0;
(3) activating the water filtration function of the ultrafiltration system;
(4) activating the water filtration function of the nanofiltration system;
(5) determining whether there is aluminum fouling in the nanofiltration membrane group, wherein steps 1-5 are repeated when it is determined that there is no aluminum fouling; and when a condition where $\Delta_1 > 0$, $\Delta_2 > 0$ and $\Delta \eta_1 > 0$ all occur lasts for 1 min, the nanofiltration membrane group is determined to suffer from aluminum fouling, and steps (6)-(8) are performed;
(6) determining a dosage $C_3$ of the first scale inhibitor and a dosage $C_4$ of the second scale inhibitor;
  wherein the dosage $C_3$ is calculated as $C_3 = 0.3 + 15\Delta\eta_1$, and is set to not exceed 0.5 ppm; and the dosage $C_4$ is calculated as $C_4 = C_2 - C_3$; and
(7) adding the first scale inhibitor to the ultrafiltration system, and adding the second scale inhibitor to the nanofiltration system; and
(8) when it is determined that there is aluminum fouling and after a filtration period is completed, activating the self-cleaning function of the ultrafiltration system to perform backwashing on the ultrafiltration membrane group, and activating the self-cleaning function of the nanofiltration system to flush the nanofiltration membrane group;
wherein the first scale inhibitor is reacted with aluminum ions and the flocculant in sequence to form a colloidal precipitate, and the colloidal precipitate is intercepted on an upstream side of the ultrafiltration membrane group.

2. The control method of claim 1, wherein the first dosing port and the second dosing port are arranged spaced apart from each other, and the first dosing port is located at an upstream side of the second dosing port.

3. The control method of claim 1, wherein the nanofiltration system further comprises a cleaning sub-system; the cleaning sub-system comprises a cleaning pipeline and a wastewater collection unit; a cleaning port is provided at the upstream side of the nanofiltration membrane group; the cleaning pipeline is communicated with the cleaning port; and the wastewater collection unit is communicated with the nanofiltration membrane group.

4. The control method of claim 3, wherein the cleaning pipeline is provided with an acid port for adding an acid solution.

5. The control method of claim 4, further comprising:
before the filtration period is completed, collecting the parameters of the water treatment system within a first preset time before an end of the filtration period, determining whether the nanofiltration membrane group requires chemical enhanced backwashing, and determining a dosage of the acid solution required for the chemical enhanced backwashing.

6. The control method of claim 5, wherein the chemical enhanced backwashing comprises an acid-involved flushing stage and an acid-free flushing stage;

the acid-involved flushing stage is performed through a step of:
after the cleaning sub-system is started, adding a preset dosage of the acid solution through the acid port; and the acid-free flushing stage is performed through a step of:
after the acid-involved flushing stage is completed, closing the acid port, and performing conventional cleaning.

7. The control method of claim 1, further comprising:
during a next filtration period after the current filtration-flushing period is completed, collecting an initial influent pressure of the nanofiltration system after starting the next filtration period; and
determining whether the nanofiltration membrane group requires restorative chemical cleaning, if yes, shutting down the nanofiltration system, and performing the restorative chemical cleaning on the nanofiltration membrane group.

8. The control method of claim 1, further comprising:
before starting the nanofiltration system, measuring a water level of the first water production sub-system to determine whether the water level of the first water production sub-system reaches a preset height.

\* \* \* \* \*